United States Patent
Miyazaki et al.

(10) Patent No.: US 11,181,542 B2
(45) Date of Patent: Nov. 23, 2021

(54) APPARATUS EQUIPPED WITH SAMPLE TEMPERATURE CONTROL FUNCTION

(71) Applicant: Shimadzu Corporation, Kyoto (JP)

(72) Inventors: Koki Miyazaki, Kyoto (JP); Shinji Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 229 days.

(21) Appl. No.: 16/408,262

(22) Filed: May 9, 2019

(65) Prior Publication Data

US 2019/0383844 A1    Dec. 19, 2019

(30) Foreign Application Priority Data

Jun. 18, 2018    (JP) .............................. JP2018-115204

(51) Int. Cl.
  *G01N 35/04*    (2006.01)
  *G01N 30/88*    (2006.01)
  (Continued)

(52) U.S. Cl.
  CPC .............. *G01N 35/04* (2013.01); *G01N 30/88* (2013.01); *G01N 2030/027* (2013.01);
  (Continued)

(58) Field of Classification Search
  CPC .. G01N 35/04; G01N 30/88; G01N 2030/027; G01N 2030/8804;
  (Continued)

(56) References Cited

U.S. PATENT DOCUMENTS 5,826,441 A * 10/1998 Oh ........................ F25D 17/065
                                                62/256
6,355,165 B1 * 3/2002 Sutton .................. B01D 15/161
                                                210/175
(Continued)

FOREIGN PATENT DOCUMENTS

| CN | 1150395 C | 5/2004 |
|---|---|---|
| JP | 2014173985 A | 9/2014 |
| JP | 2016-176749 A | 10/2016 |

OTHER PUBLICATIONS

Extended European Search Report, dated Dec. 6, 2019, for the counterpart European Patent Application 19179920.4.
(Continued)

*Primary Examiner* — Jill A Warden
*Assistant Examiner* — John McGuirk
(74) *Attorney, Agent, or Firm* — Muir Patent Law, PLLC

(57) ABSTRACT

To suppress inflow of external air through a rack insertion opening while a sample rack is pulled out. An apparatus includes a housing, a temperature control space, and an air temperature control part. The housing has the rack insertion opening on one side surface for putting in and taking out the sample rack. The air temperature control part has an air intake portion for intake of air in the temperature control space, a fan for blowing air taken in from the air intake portion toward the sample rack accommodated in the temperature control space, and a cooling element provided to cool the air on a path of air taken in from the air intake portion. The air temperature control part is configured to reduce an amount of air flowing near the rack insertion opening while the sample rack is pulled out from the temperature control space as compared to while the sample (Continued)

rack is accommodated in the temperature control space, so as to suppress inflow of air through the rack insertion opening.

7 Claims, 4 Drawing Sheets

(51) Int. Cl.
*G01N 30/02* (2006.01)
*G01N 35/00* (2006.01)

(52) U.S. Cl.
CPC ............... *G01N 2030/8804* (2013.01); *G01N 2035/00445* (2013.01); *G01N 2035/0413* (2013.01)

(58) Field of Classification Search
CPC . G01N 2035/00445; G01N 2035/0413; G01N 2035/0498; G01N 2035/00346; G01N 35/026; G01N 2035/00306; G01N 2030/303; G01N 30/24; G01N 30/30; Y02B 30/70; F25B 21/02; F25D 17/06; F24F 13/029; F24F 11/77; F24F 11/0001; B01L 1/00; B08B 15/023
See application file for complete search history.

(56) References Cited

U.S. PATENT DOCUMENTS

| | | | |
|---|---|---|---|
| 2012/0285872 A1 | 11/2012 | Shreve et al. | |
| 2014/0250938 A1 | 9/2014 | Tanaka | |
| 2015/0346069 A1* | 12/2015 | Inoue | G01N 30/16 73/863.11 |
| 2016/0274011 A1 | 9/2016 | Maeda | |
| 2017/0294069 A1* | 10/2017 | Fan | F25D 17/06 |

OTHER PUBLICATIONS

First Office Action from the Chinese Intellectual Property Office for corresponding application No. CN 201910300831.3, dated May 25, 2021, submitted with a machine translation.

Notice of Reasons for Rejection from the Japanese Patent Office dated Aug. 31, 2021 for the Japanese Patent Application No. 2018-115204.

* cited by examiner

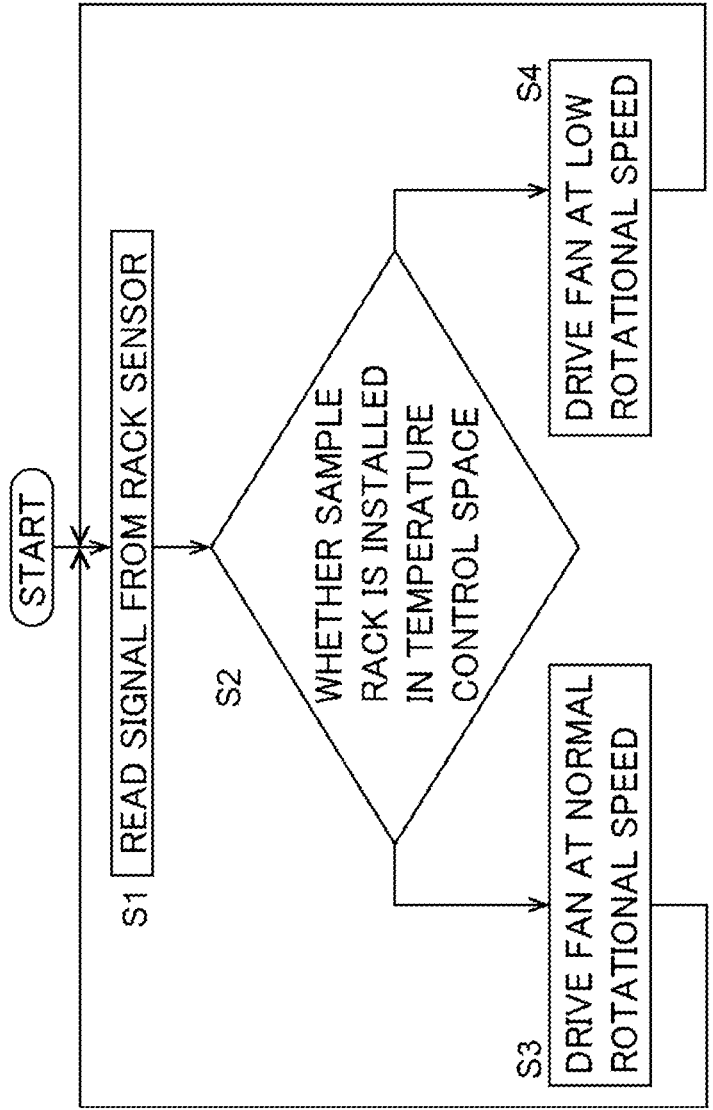

APPARATUS EQUIPPED WITH SAMPLE TEMPERATURE CONTROL FUNCTION

BACKGROUND OF THE INVENTION

1. Field of the Invention

The present invention relates to an apparatus having a sample temperature control function, which is used in an analysis device, such as a liquid chromatograph, that controls a temperature while cooling a sample.

2. Description of the Related Art

Some liquid chromatograph autosamplers have a function of cooling a sample plate containing a sample to be analyzed and adjusting the temperature to a constant temperature in order to prevent alteration or the like of the sample (for example, see JP-A-2016-176749).

Temperature control systems of a sample include a direct cooling system in which a sample plate holding a sample is disposed on a metal plate on which a cooling element, such as a Peltier element, is attached and a container is directly cooled (see JP-A-2016-176749), and an air temperature control system in which a sample plate is disposed in space (hereinafter referred to as temperature control space) thermally separated from external air, and air in the temperature control space is cooled by a cooling element, such as a Peltier element.

While the direct cooling system has an advantage that a response speed of temperature control is satisfactory since the sample plate is directly cooled, there is also a problem that it is difficult to uniformly cool the sample plate since the sample plate is locally cooled from a lower surface side of the sample plate. While the air cooling system is inferior to the direct cooling system in a response speed of temperature control, it is easy to cool a sample plate uniformly in the air cooling system as compared with the direct cooling system since the temperature control space in which the sample plate is disposed is cooled entirely.

Further, in an apparatus, such as an autosampler provided with a sample temperature control function, a pull-out sample rack is generally employed to place a sample in the temperature control space. The pull-out sample rack only requires a sample rack mounted with a sample plate holding a sample to be inserted from a rack insertion opening provided on a housing side surface into the temperature control space. Accordingly, installation work of a sample in the temperature control space is easy.

SUMMARY OF THE INVENTION

In the pull-out sample rack, when the sample rack is pushed to a predetermined position, the rack insertion opening is sealed by a handle of the sample rack, so that adiabatic sealing property of the temperature control space is maintained. On the other hand, when the sample rack is pulled out of the temperature control space, the rack insertion opening is open, and external air flows in from the rack insertion opening. In a case where a dew point temperature of air flowing in from the rack insertion opening is higher than a temperature of a component in the temperature control space, dew condensation is generated on a surface or in the inside of the component, which may result in problems, such as that operation malfunction of a metal component due to rusting, and short-circuiting of an electronic component.

The above problem is remarkable when an air cooling system is employed as a temperature control system. In the air cooling system, since the entire temperature control space is cooled, dew condensation tends to be generated when external air flows in.

Therefore, an object of the present invention is to suppress inflow of external air from the rack insertion opening when the sample rack is pulled out.

The apparatus according to the present invention comprises a housing, temperature control space, and an air temperature control part as a basic configuration. The housing has a rack insertion opening on one side surface for putting in and taking out a sample rack. The temperature control space is space, which is provided in the inside of the housing, in which the sample rack inserted through the rack insertion opening is accommodated and for performing temperature control of a sample mounted on the sample rack. The air temperature control part has an air intake portion for intake of air in the temperature control space, a fan for blowing air taken in from the air intake portion toward the sample rack accommodated in the temperature control space, and a cooling element provided to cool the air on a path of air taken in from the air intake portion.

A first approach according to the present invention for suppressing inflow of external air from the rack insertion opening when the sample rack is pulled out is to configure the air temperature control part to reduce an amount of air flowing near the rack insertion opening when the sample rack is pulled out from the temperature control space as compared to when the sample rack is accommodated in the temperature control space, so as to suppress inflow of air through the rack insertion opening.

In a preferred first embodiment of the first approach, the air temperature control part includes a rising guide that functions to raise air blown from the air blowing part to a position higher than the rack insertion opening only while the sample rack is pulled out from the temperature control space. While the sample rack is pulled out of the temperature control space, cooled air is raised to a position higher than a height at which the rack insertion opening is provided. Accordingly, the air cooled by the temperature control part does not flow in the vicinity of the rack insertion opening while the sample rack is pulled out of the temperature control space, and inflow and outflow of air through the rack insertion opening is suppressed.

In an example of the above mode, the air temperature control part is configured to blow air cooled in a gap formed between a lower surface of the sample rack and a floor surface of the temperature control space in a state where the sample rack is inserted into the temperature control space, and blow cooled air to a position higher than the rack insertion opening in a state where the sample rack is pulled out of the temperature control space.

The above mode can be achieved by a configuration, in which the sample rack has an air guide plate in an end portion of the air temperature control part side, the air temperature control part has a hood on an air outlet side of the fan, the hood and the air guide plate abut on each other in a state where the sample rack is inserted into the temperature control space, so that a path for guiding air from the fan to a gap formed between a lower surface of the sample rack and a floor surface of the temperature control space, and the hood and the air guide plate are separated in a state where the sample rack is pulled out of the temperature control space, so that a path for guiding air from the fan in an upper direction with the rising guide is formed.

A preferred second embodiment of the first approach of the present invention includes an air volume control part for controlling operation of the fan in the air temperature control part. The air volume control part is configured to reduce air volume of the fan while the sample rack is pulled out from the accommodation space as compared to while the sample rack is accommodated in the temperature control space. If air volume of the fan is reduced while the sample rack is pulled out from the accommodation space, flow of air in the entire temperature control space is reduced, and as a result, inflow and outflow of air through the rack insertion opening is suppressed.

Note that the first embodiment and the second embodiment can be combined with each other, and, by the synergetic effect obtained by the combination, the effect of suppressing inflow of external air into the temperature control space can be further enhanced.

A second approach according to the present invention for suppressing inflow of external air from the rack insertion opening while the sample rack is pulled out is to pressurize the temperature control space with cooled air to create an environment in which external air cannot easily flow into the temperature control space from the rack insertion opening even if the sample rack is pulled out from the temperature control space.

The second approach can be achieved by the apparatus configured to include an external air intake part for guiding air outside the temperature control space directly to the air intake portion of the air temperature control part, and suppress inflow of air through the rack insertion opening by pressure of air introduced by the external air intake part. By providing the external air intake portion, the inside of the temperature control space becomes in a state of being pressurized, and inflow of external air from the rack insertion opening is suppressed. Further, since external air taken in from the external air intake part is taken directly into the air temperature control part, and cooled and dehumidified by the cooling element, dew condensation is not generated in the temperature control space due to external air flowing in from the external air intake part.

The above-described first and second approaches of the present invention can be implemented in combination with each other, and the effect of suppressing inflow of external air from the rack insertion opening can be improved.

The present invention can be applied to an autosampler for a liquid chromatograph.

In the first approach of the present invention, an amount of air flowing near the rack insertion opening while the sample rack is pulled out of the temperature control space is smaller than that while the sample rack is accommodated in the temperature control space. Accordingly, inflow and outflow of air through the rack insertion opening is suppressed. In this manner, generation of dew condensation in the temperature control space is suppressed.

In the second approach of the present invention, the external air intake part for guiding air outside the temperature control space directly to the air intake portion of the air temperature control part is included, so that the inside of the temperature control space becomes in a pressurized state and inflow of external air from the rack insertion opening is suppressed.

BRIEF DESCRIPTION OF THE DRAWINGS

FIG. 5 is a flowchart for explaining control operation of air volume of a fan of an air temperature control part.

DETAILED DESCRIPTION OF THE INVENTION

Hereinafter, an embodiment of an apparatus according to the present invention will be described with reference to the accompanying drawings.

Figure 1:
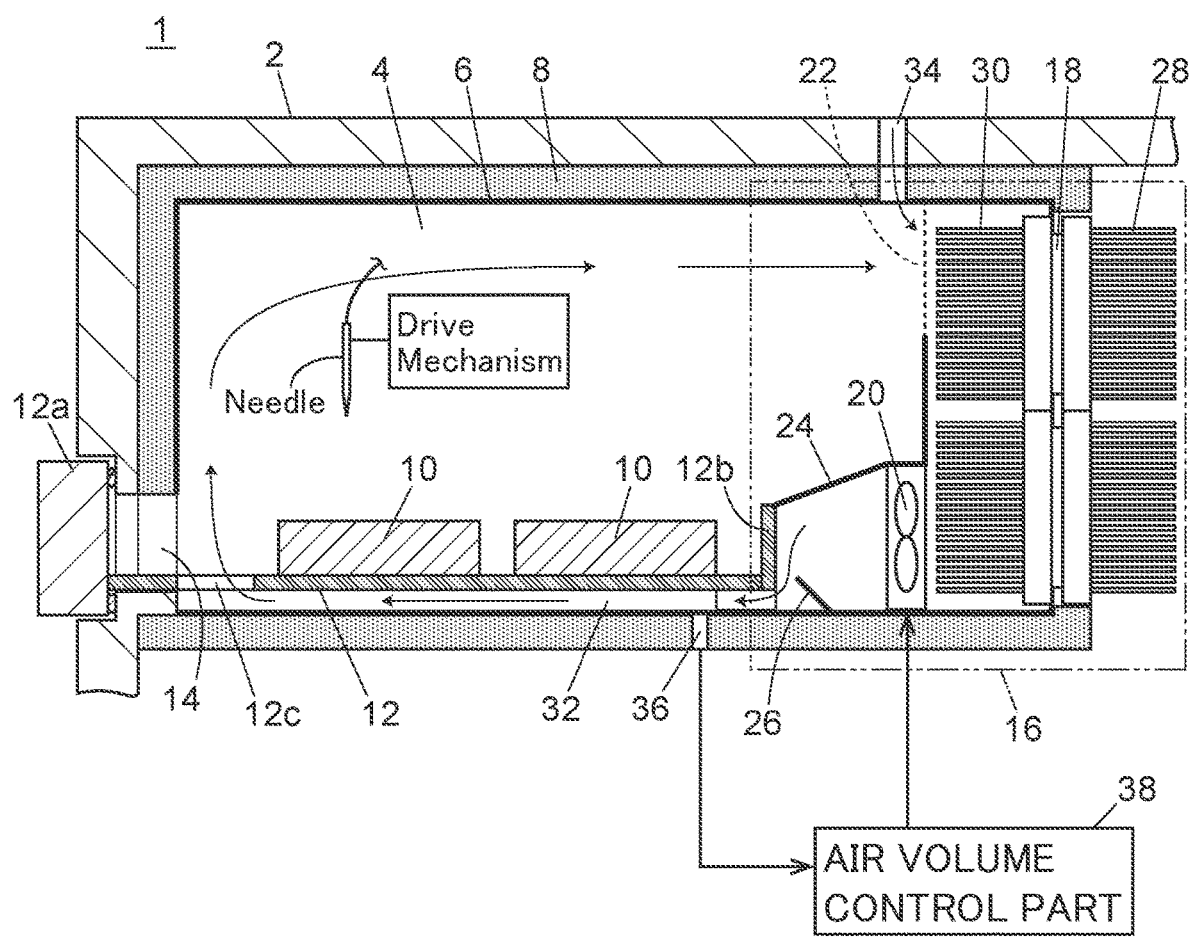
FIG. 1 is a schematic cross-sectional configuration diagram showing an embodiment of an apparatus having a sample temperature control function.

As shown in FIG. 1, an apparatus 1 includes a temperature control space 4 inside a housing 2. The temperature control space 4 is defined by sheet metal 6, and an outer peripheral surface of the sheet metal 6 is covered with a heat insulating layer 8 made from, for example, a polyethylene resin foam material, except for a rear surface side (right side in FIG. 1) on which an air temperature control part 16 is provided.

A sample plate 10 holding a sample is placed on the bottom of the temperature control space 4 in a state of being mounted on the sample rack 12. Note that the sample plate 10 may hold a plurality of vials containing a sample, or may have a plurality of wells containing a sample on a top surface. On a front side (left side in FIG. 1) which is one side of the housing 2, a rack insertion opening 14 which is an opening for inserting the sample rack 12 from a front end side to be accommodated in the temperature control space 4, is provided.

A proximal end of the sample rack 12 is provided with a handle 12a for holding the sample rack 12. Packing is attached to a peripheral edge of a sample rack front end side surface (surface on a right side in the diagram) of the handle 12a, and when the sample rack 12 is inserted from the front end side into the temperature control space 4, the packing of the handle 12a abuts on an edge of the rack insertion opening 14 so that sealing property of the rack insertion opening 14 is maintained.

Further, the sample rack 12 is disposed in the temperature control space 4 with a gap 32 between the sample rack 12 and a floor surface of the temperature control space 4. A air guide plate 12b is provided in a front end portion of the sample rack 12. The air guide plate 12b is provided, for example, to extend vertically upward from a tip of the sample rack 12. The air guide plate 12b guides cooled air to the gap 32 between a lower surface of the sample rack 12 and the bottom surface of the temperature control space 4 together with a hood 24 described later. On a proximal end side of the sample rack 12, an opening 12c, for letting air flowing in the gap 32 between the sample rack 12 and the floor surface of the temperature control space 4 flow upward, is provided.

The air temperature control part 16 is provided on a back surface side of the housing 2. The air temperature control part 16 includes a Peltier element 18 which is a cooling element, a fan 20, an air intake portion 22, the hood 24, a rising guide 26, a heat radiation fin 28, and a heat absorbing fin 30. The air temperature control part 16 sucks air in the temperature control space 4 from the air intake portion 22, cools the air with the Peltier element 18, and supplies the cooled air toward the sample plate 10 in the temperature control space 4.

The Peltier element 18 is provided in such a way that a heat absorption side is disposed inside the temperature control space 4 and a heat radiation side is disposed outside of the temperature control space 4. The heat absorbing fin 30 is attached to an endothermic surface of the Peltier element 18, and the heat radiation fin 28 is attached to a heat dissipation surface of the Peltier element 18. The fan 20 is provided to blow air toward a front side of the housing 2 in a lower portion in the temperature control space 4. The air intake portion 22 is an opening for intake provided near the air intake portion in the temperature control space 4.

The hood 24 and the rising guide 26 are provided on an air outlet side of the fan 20. The hood 24 is provided to guide air blown by the fan 20 to the gap 32 between the lower surface of the sample rack 12 and the bottom surface of the temperature control space 4 together with the air guide plate 12b of the sample rack 12 accommodated in the temperature control space 4. The rising guide 26 is provided to guide the air blown by the fan 20 when the sample rack is pulled out to an upper portion in the temperature control space 4, that is, above the height at which the rack insertion opening 14 is provided.

While the sample rack 12 is accommodated in the temperature control space 4, the upward air flow is blocked by the air guide plate 12b and the hood 24, so the rising guide 26 does not function. For this reason, in a state where the sample rack 12 is accommodated in the temperature control space 4, air taken in from the air intake portion 22 and cooled by the Peltier element 18 takes a circulation path, in which the air flows through the gap 32 between the lower surface of the sample rack 12 and the floor surface of the temperature control space 4, escapes upward from the opening 12c of the sample rack 12, and is taken in again from the air intake portion 22, as shown by an arrow in FIG. 1.

Figure 2:
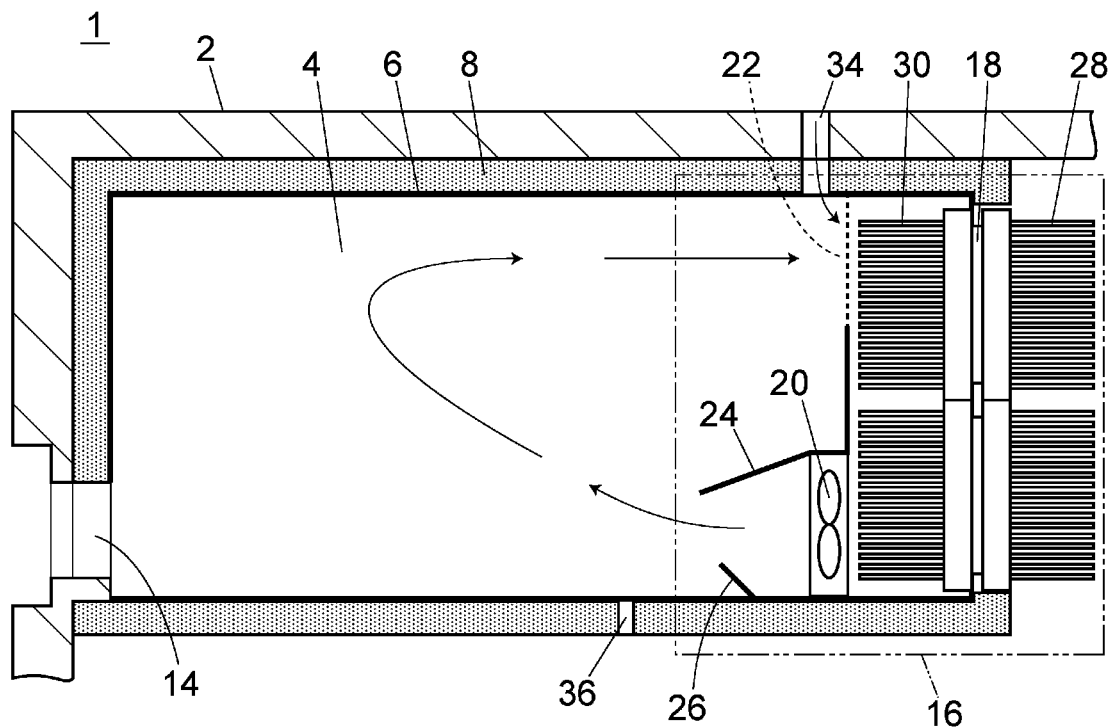
FIG. 2 is a cross-sectional view for explaining flow of air in temperature control space when a sample rack is pulled out in the embodiment.

On the other hand, as shown in FIG. 2, while the sample rack 12 is pulled out of the temperature control space 4, the rising guide 26 functions. Air blown by the fan 20 takes a circulation path, in which the air rises to an upper portion in the temperature control space 4 by the rising guide 26 and is taken in again from the air intake portion 22. In this manner, flow of air in the vicinity of the rack insertion opening 14 is reduced, and inflow and outflow of air through the rack insertion opening 14 is suppressed.

Note that in the embodiment shown in FIGS. 1 and 2, while the sample rack 12 is accommodated in the temperature control space 4, the air blown by the fan 20 flows through the gap 32 between the lower surface of the sample rack 12 and the floor surface of the temperature control space 4. However, the present invention is not limited to such a configuration, and any configuration may be employed as long as the configuration allows cooled air to flow along the sample rack 12.

Figure 3:
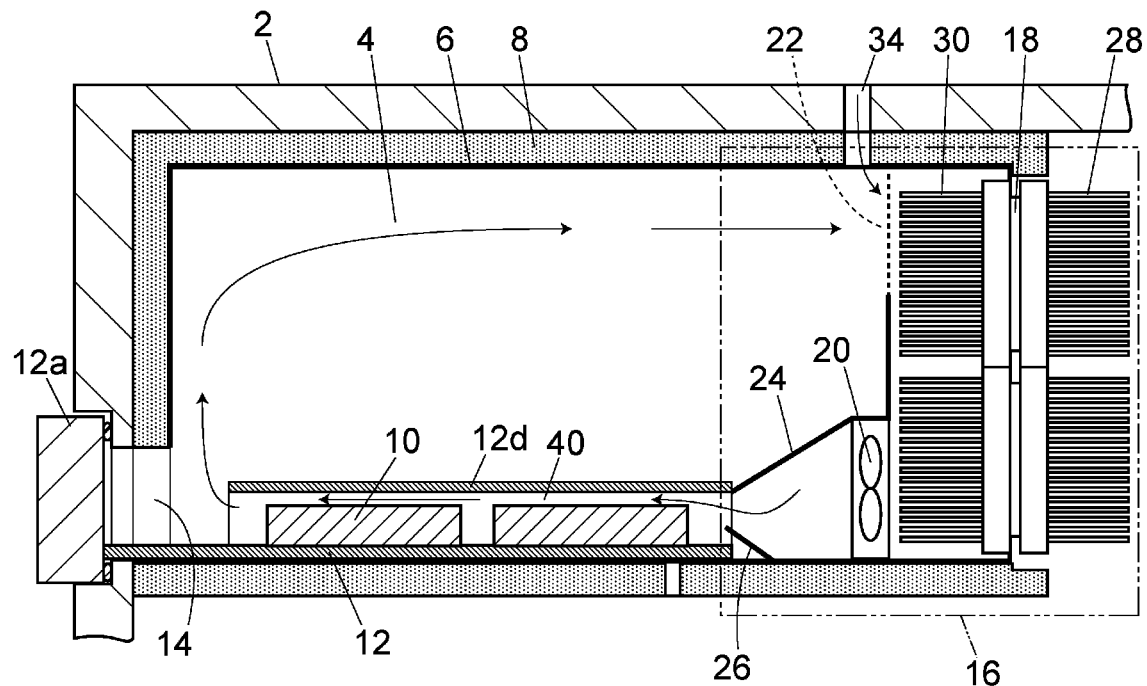
FIG. 3 is a schematic cross-sectional configuration diagram showing a variation of the apparatus having the sample temperature control function.
Figure 4:
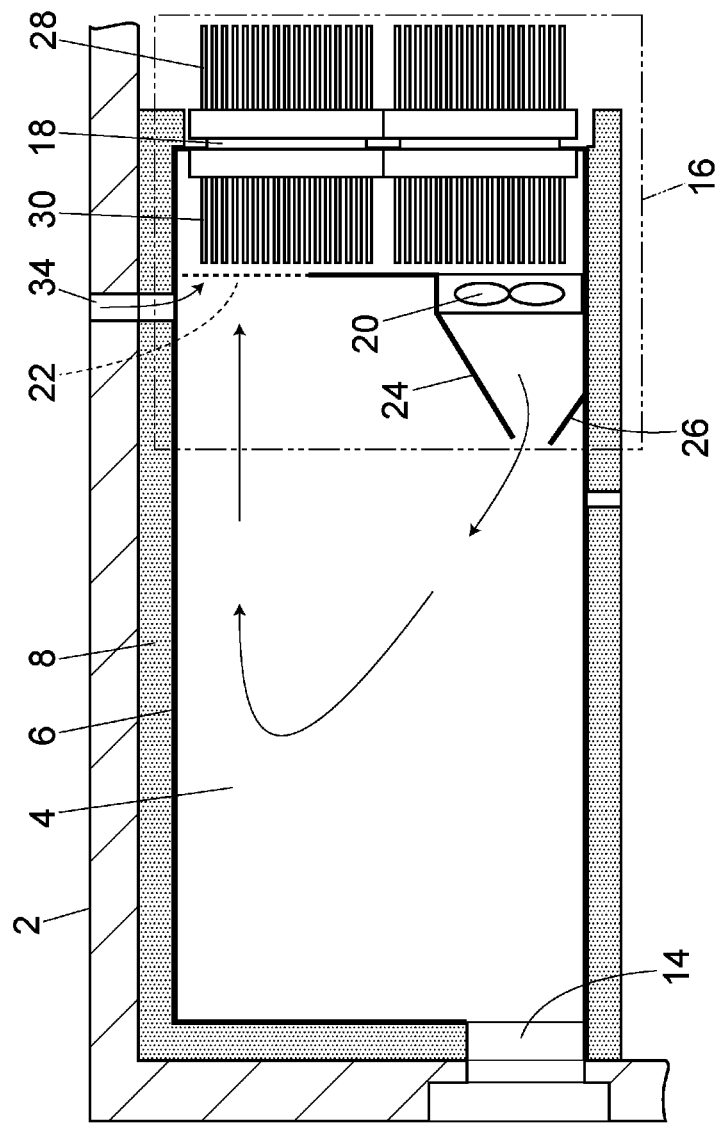
FIG. 4 is a cross-sectional view for explaining flow of air in the temperature control space when the sample rack is pulled out in the embodiment.

FIGS. 3 and 4 show variations of the configuration for allowing cooled air to flow along the sample rack 12. The configurations of FIGS. 3 and 4 may be employed instead of the configurations of FIGS. 1 and 2.

In the variations shown in FIGS. 3 and 4, a cover 12d is attached above the sample plate 10 of the sample rack 12, and space 40 in which air flows is formed between the bottom plate of the sample rack 12 and the cover 12d. Note that the cover 12d may be provided with, for example, a through-hole for allowing a needle for collecting a sample held by the sample plate 10 to pass through.

The hood 24 and the rising guide 26 are provided on the air outlet side of the fan 20 in the same way as the embodiments of FIGS. 1 and 2. The hood 24 is provided to abut on a tip end portion of the cover 12d of the sample rack 12 accommodated in the temperature control space 4 so as to guide the air blown by the fan 20 to the space 40. While the sample rack 12 is accommodated in the temperature control space 4, the upward air flow is blocked by the cover 12d and the hood 24, and the rising guide 26 does not function. For this reason, in a state where the sample rack 12 is accommodated in the temperature control space 4, air taken in from the air intake portion 22 and cooled by the Peltier element 18 takes a circulation path, in which the air flows in the space 40 from a tip side to a proximal end side of the cover 12d to escape upward, and is taken in again from the air intake portion 22, as shown by an arrow in FIG. 3.

On the other hand, as shown in FIG. 4, while the sample rack 12 is pulled out of the temperature control space 4, the rising guide 26 functions. Air blown by the fan 20 takes a circulation path, in which the air rises to an upper portion in the temperature control space 4 by the rising guide 26 and is taken in again from the air intake portion 22. In this manner, flow of air in the vicinity of the rack insertion opening 14 is reduced, and inflow and outflow of air through the rack insertion opening 14 is suppressed.

Referring back to FIG. 1 and continuing the description, an air vent 34 is provided in the vicinity of the air intake portion 22 of the air temperature control part 16. The air vent 34 constitutes an external air intake part for guiding external air directly to the air intake portion 22. The provision of the air vent 34 allows external air to be taken into the air intake portion 22 of the air temperature control part 16, so that the temperature control space 4 is pressurized. With the inside of the temperature control space 4 being pressurized, while the sample rack 12 is pulled out and the rack insertion opening 14 is open, inflow of external air from the rack insertion opening 14 is suppressed. External air flowing in from the air vent 34 is taken directly into the air temperature control part 16 and is cooled and dehumidified by the Peltier element 18. Therefore, dew condensation is not generated in the temperature control space 4 due to inflow air from the vent 34.

Further, an air volume control part 38 for controlling air volume of the fan 20 is provided. The air volume control part 38 is a function obtained as a program is executed by an arithmetic element, such as a microcomputer, and is obtained by, for example, a control circuit board mounted on the apparatus 1 in order to manage the operation of the apparatus 1.

The air volume control part 38 is configured to change a rotational speed of the fan 20 depending on whether the sample rack 12 is accommodated in the temperature control space 4 or not. Specifically, while the sample rack 12 is accommodated in the temperature control space 4, the air volume control part 38 drives the fan 20 at a preset first rotational speed, and while the sample rack 12 is pulled out of the temperature control space 4, the air volume control part 38 drives the fan 20 at a second rotational speed lower than the first rotational speed. In this manner, the flow of air in the temperature control space 4 while the rack insertion opening 14 is open is reduced, and inflow and outflow of air through the rack insertion opening 14 is suppressed.

Whether or not the sample rack 12 is accommodated in the temperature control space 4 can be detected by using, for example, an optical sensor. In this embodiment, a rack sensor 36 is embedded on a bottom side of the temperature control space 4. The air volume control part 38 is configured to control air volume of the fan 20 by detecting whether or not the sample rack 12 is accommodated in the temperature control space 4 based on a sensor signal from the rack sensor 36. Note that the rack sensor 36 may be any sensor as long as it can detect whether or not the sample rack 12 is installed at a predetermined position, and may be provided at any position.

The control of the rotational speed of the fan 20 by the air volume control part 38 will be described with reference to a flowchart of FIG. 5.

The air volume control part 38 reads a signal from the rack sensor 36 at regular intervals (Step S1), and detects whether or not the sample rack 12 is installed at a predetermined position in the temperature control space 4 (Step S2). In a case where the sample rack 12 is installed at a predetermined position in the temperature control space 4, the air volume control part 38 drives the fan 20 at the preset first rotational speed (normal rotational speed) (Step S3). On the other hand, in a case where the sample rack 12 is not installed at a predetermined position in the temperature control space 4, that is, in a case where the sample rack 12 is pulled out from the temperature control space 4, the fan 20 is driven at the second rotational speed (Step S4).

Note that in the embodiments described above, description is made for a configuration including all of the function (first function) of changing a circulation path of air between a case where the sample rack 12 is accommodated in the temperature control space 4 and a case where the sample rack 12 is not accommodated in the temperature control space 4, the function (second function) of changing air volume of the fan 20 between a case where the sample rack 12 is accommodated in the temperature control space 4 and a case where the sample rack 12 is not accommodated in the temperature control space 4, and the function (third function) of taking external air directly into the air temperature control part 16 and pressurizing the temperature control space 4. However, the present invention is not limited to the above, and may have a configuration including any one or two of the first to third functions.

Further, the apparatus 1 of the embodiment described above is obtained by, for example, a liquid chromatograph autosampler. When the apparatus 1 is an autosampler, a needle or a syringe pump for sucking a sample held by the sample plate 10, a drive mechanism for moving the needle, and the like are also provided in the temperature control space 4.

What is claimed is:

1. An apparatus, comprising:
   a housing having a rack insertion opening for putting in and taking out a sample rack on one side surface;
   a removable sample rack inserted into the rack insertion opening;
   a temperature control space, provided inside the housing, in which the sample rack inserted through the rack insertion opening is accommodated, and for performing temperature control of a sample mounted on the sample rack; and
   an air temperature control part comprising an air intake portion for intake of air in the temperature control space, a fan for blowing air taken in from the air intake portion toward the sample rack accommodated in the temperature control space, and a cooling element provided on a path of air taken in from the air intake portion to cool the air,
   wherein
   the air temperature control part is configured to guide air blown from the fan to a position higher than the rack insertion opening while the sample rack is pulled out of the temperature control space so that an amount of air flowing near the rack insertion opening while the sample rack is pulled out from the temperature control space is reduced as compared to while the sample rack is accommodated in the temperature control space so as to suppress inflow of air through the rack insertion opening.

2. The apparatus according to claim 1, wherein
   the air temperature control part includes a rising guide that functions to raise air blown from the fan to a position higher than the rack insertion opening only while the sample rack is pulled out from the temperature control space, and
   the rising guide is provided, between the fan and the rack insertion opening, on a floor surface of the temperature control space so as to extend diagonally upward to a direction toward the rack insertion opening.

3. The apparatus according to claim 2, wherein
   the air temperature control part is configured to guide air blown from the fan along a length of the sample rack in a gap formed between a lower surface of the sample rack and a floor surface of the temperature control space while the sample rack is accommodated in the temperature control space.

4. The apparatus according to claim 3, wherein
   the sample rack has an air guide plate,
   the air temperature control part has a hood on an air outlet side of the fan,
   the hood and the air guide plate are in contact with each other while the sample rack is accommodated in the temperature control space, so that a path for guiding air blown from the fan along a length of the sample rack toward the rack insertion opening is formed in a gap between a lower surface of the sample rack and a floor surface of the temperature control space, and
   the hood and the air guide plate are separated while the sample rack is pulled out of the temperature control space, so that a path for guiding air blown from the fan to a position higher than the rack insertion opening is formed.

5. The apparatus according to claim 1, further comprising:
   an air volume control part for controlling operation of the fan in the air temperature control part, the air volume control part being configured to reduce air volume of the fan while the sample rack is pulled out from the temperature control space as compared to while the sample rack is accommodated in the temperature control space.

6. The apparatus according to claim 1, further comprising an external air intake part for guiding air outside of the temperature control space directly to the air intake portion of the air temperature control part.

7. The apparatus according to claim 1, wherein the apparatus is an autosampler for a liquid chromatograph.

* * * * *